United States Patent
Takano et al.

(10) Patent No.: US 8,066,302 B2
(45) Date of Patent: Nov. 29, 2011

(54) CENTER FRAME IN CRAWLER TRAVEL DEVICE AND METHOD FOR MANUFACTURING CENTER FRAME

(75) Inventors: Yoshiyuki Takano, Saitama (JP); Yasuharu Kimura, Saitama (JP); Akira Misu, Saitama (JP)

(73) Assignees: Komatsu Ltd., Tokyo (JP); Komatsu Utility Co., Ltd., Tokyo (JP)

( * ) Notice: Subject to any disclaimer, the term of this patent is extended or adjusted under 35 U.S.C. 154(b) by 81 days.

(21) Appl. No.: 12/373,279

(22) PCT Filed: Jun. 15, 2007

(86) PCT No.: PCT/JP2007/062144
§ 371 (c)(1),
(2), (4) Date: Jul. 31, 2009

(87) PCT Pub. No.: WO2008/007515
PCT Pub. Date: Jan. 17, 2008

(65) Prior Publication Data
US 2009/0284000 A1 Nov. 19, 2009

(30) Foreign Application Priority Data
Jul. 11, 2006 (JP) .................................. 2006-190388

(51) Int. Cl.
*B62D 21/06* (2006.01)
(52) U.S. Cl. ....................................................... 280/794
(58) Field of Classification Search .................. 280/781, 280/793, 794; 180/311, 312
See application file for complete search history.

(56) References Cited

U.S. PATENT DOCUMENTS

| | | | | |
|---|---|---|---|---|
| 4,231,699 | A * | 11/1980 | Thompson | 414/687 |
| 7,204,519 | B2 * | 4/2007 | Kubo et al. | 280/781 |
| 7,293,374 | B2 * | 11/2007 | Fukushima | 37/397 |
| 7,293,375 | B2 * | 11/2007 | Fukushima et al. | 37/397 |
| 7,338,081 | B2 * | 3/2008 | Urase et al. | 280/781 |
| 7,730,647 | B2 * | 6/2010 | Kubo et al. | 37/397 |
| 2004/0232687 | A1 * | 11/2004 | Kubo et al. | 280/781 |

FOREIGN PATENT DOCUMENTS

| | | |
|---|---|---|
| EP | 1564113 B1 | 12/2006 |
| EP | 1566326 B1 | 3/2008 |
| JP | 2004-189003 A | 1/2004 |
| JP | 2005-1651 A | 1/2005 |
| JP | 2005-255141 A | 9/2005 |
| WO | WO 03/042022 | 5/2003 |

\* cited by examiner

*Primary Examiner* — Paul N Dickson
*Assistant Examiner* — Robert A Coker
(74) *Attorney, Agent, or Firm* — Fish & Richardson P.C.

(57) ABSTRACT

The present invention provides a center frame designed so that a center member, legs, and a lower plate can be formed by bending metal sheets, and to provide a manufacturing method for the center frame.
A pair of front legs 13 and a pair of rear legs 14 are formed by bending metal sheets so as to have substantially reverse U-shaped cross-sections. The center member 10 is formed by bending a metal sheet so as to have a substantially square U-shaped cross-section. The front legs 13, the rear legs 14, the center member 10, a center front plate 22, and a center rear plate 23 are placed on and securely weld to the lower plate 18, which has an approximate X shape, in a plan view, and an isosceles trapezoidal shape in a lateral cross-section. This eliminates the need for expensive molds and makes it possible to easily manufacture the center frame from the center member, legs, and lower plate formed by bending metal sheets.

19 Claims, 17 Drawing Sheets

PRIOR ART

PRIOR ART

PRIOR ART

US 8,066,302 B2

CENTER FRAME IN CRAWLER TRAVEL DEVICE AND METHOD FOR MANUFACTURING CENTER FRAME

CROSS-REFERENCE TO RELATED APPLICATION

This application claims priority to PCT Application No. PCT/JP2007/062144 filed on Jun. 15, 2007, which, in turn, claims priority to Japanese Patent Application No. 2006-190388 filed on Jul. 11, 2006. The entire contents of these applications are hereby incorporated by reference.

TECHNICAL FIELD

The present invention relates to a center frame in a crawler travel device that has crawlers, or endless belts, on the left and right sides of the travel device, and relates to a manufacturing method for the center frame.

BACKGROUND ART

Conventionally, a crawler travel device that has on its left and right sides endless belts suitable for travel on uneven ground are used in construction machines, civil engineering machines, agricultural machines, transport vehicles, etc. The crawler travel devices include: a pair of crawler frames, each of which supports an endless belt; a center frame disposed between the crawler frames; and an upper rotating body placed on the center frame.

The center frame includes as main components: a center member supporting the upper rotating body, and front and rear legs disposed on the left and right sides of the center members. The upper rotating body is composed of work equipment, a cabin, a driver's seat, an engine, a control device, etc.

The center frame includes a center member and front and rear legs formed separately or integrally.

As an example of the configuration in which a center member and legs are separately formed, a center frame (refer to the Patent Document 1) or suchlike has been proposed in which a center member is formed from a steel plate and hollow legs are formed from hollow circular pipes or by bending a steel plate.

Only a box-like portion defined by a center member in the present invention is called "a center frame" in the Patent Document 1. Crawler frames, legs, a center front plate, and a center rear plate in the present invention are called "side frames," "legs," "a front plate," and "a rear plate" respectively in the Patent Document 1. However, in the description of the configuration of the Patent Document 1 in this specification, the above-mentioned terms used in the present invention will be quoted.

However, "a central portion" in the Patent Document 1, which may correspond to the box-like portion defined by the center member in the present invention, is quoted as is because the present invention does not use an equivalent term. The center member in the present invention is divided into the upper plate, and left and right plates referred to in the Patent Document 1, and these terms "upper plate" and "side plate" are used as necessity requires.

As shown in FIG. 15, the center frame described in the Patent Document 1 includes: a central portion 50; left and right crawler frames 51, which are disposed on the left and right sides of the central portion 50; a pair of front legs 52 and a pair of rear legs 53 connected to the central portion 50.

The central portion 50 is formed from a substantially rectangular steel plate or suchlike. Side plates 56, a center front plate 57, a center rear plate 58, etc., are fixed between the upper plate 54 and lower plate 55 by welding. Thus, the central portion 50 has the form of a box-like structure. Further, in order to accommodate a center joint (not shown) and so on, a through-opening 59A is made vertically in the central portion. 50 of the upper plate 54.

Each of the crawler frames 51 is composed of an intermediate frame 60, an idler wheel bracket 61, a motor bracket 62, etc. A crawler 51 is wound around each crawler frame 51 and between the idler wheel and driving wheel.

The left and right front legs 52 secured to the side plates of the central portion 50 by welding are formed from pipes of hollow circular cross-section. The leading end of each of the front legs 52 is securely welded to the side plate 63 of the intermediate frame 60 of the crawler frame 51. The rear legs are formed from pipes of hollow circular cross-section as in the front legs 52. Each of the leading ends of the rear legs is securely welded to a corner between the center rear plate and the corresponding side plate 56 of the central portion The other end of each of the rear legs 53 is securely welded between the rear portion of the intermediate frame 60 of the corresponding crawler 51 and the connection flange 64 on the corresponding motor bracket 62 side.

The Patent Document 1 discloses another configuration of the center frame, and each of front legs 65 and each of the rear legs 66 in this configuration are shown in FIG. 16. In this configuration, the upper plates of the front and rear legs 65 and 66 are formed by bending a steel plate into a trapezoid by a press molding means, and a lower plate 67 is welded to the ends of the bent upper plates.

As a configuration in which a center member and legs are integrated, a center frame (refer to Patent Document 2) has been proposed in which a center member and legs are integrally formed by casting means, pressing means, or forging means.

A track frame in the present invention is called "a crawler frame" in the Patent Document 2. In addition, the center frame, crawler frame, center member, and lower plate in the present invention are called "a machine frame," "a track frame," "a center frame," and "a bottom frame" respectively in the Patent Document 2. However, quoting the terms mentioned above in the present invention, the configuration of the Patent Document 2 will be described.

As shown in FIG. 17, in the track frame 70 described in Patent Document 2, crawler frames 74 are disposed on the left and right sides of the center frame 76. The center frame 76 includes a center member 71, and front legs 72 and rear legs 73 integrally formed on the left and right sides of the center member 71. In the center frame, a top, side walls, and the pairs of legs are integrally molded by a molding means so that the bottom of the center frame is open. A lower plate 75 is securely welded to the bottom of the center frame.

Patent Document 1: Pamphlet of International Application No. 03-042022

Patent Document 2: Japanese Patent Application Laid-Open No. 2005-255141

DISCLOSURE OF THE INVENTION

Problems to be Solved by the Invention

As described in the Patent Document 1, a conventional center frame is constructed by securely welding together the upper plate, side plate, center front plate, center rear plate, and front and rear legs, all of which are formed separately. This leads to a problem in that it increases the number of components and thus the cost of materials. The increase in the number of components increases the number of parts requiring welding and man-hours required for welding.

Further, to securely weld each component in position, the component must be welded from an appropriate direction. This requires multi-directional welding, resulting in reduced work efficiency and increased man-hours. In addition, a workshop or facility suitable for multi-directional welding is required.

As described in Patent Document 1, conventional legs have been formed from hollow circular pipes or by bending a steel plate into a hollow trapezoid by a pressing means. Use of hollow circular pipes cannot avoid incurring an overall cost increase because such pipes are expensive. In addition, pressing a steel plate into a hollow trapezoid requires pressing molds, which are expensive. Thus, such cost increases are inevitable.

In the Patent Document 2, components equivalent to the upper plate, side plates, center front and rear plates, and front and rear legs in the Patent Document 1 are integrally molded by a molding means. This has the advantage of decreasing the number of components and simplifying the manufacturing process.

However, molding by casting requires a metal material for use in the casting, which increases the manufacturing costs of a molding die together with the cost of materials. Pressing or casting means for use in molding require expensive molds, although dimensional accuracy may be ensured to a certain extent.

The present invention has been proposed in view of the problems discussed above. It is accordingly an object of the present invention to provide a center frame designed so that a center member, legs, and a lower plate are formed by sheet metal bending.

Means for Solving the Problems

The object of the present invention can be achieved by inventions described in claims 1 through 8.

That is, the main feature of a center frame is characterized by comprising: a center member made of a metal sheet and supporting an upper rotating body; a pair of legs made of a metal sheet and disposed on each of left and right sides of the center member such that there are spaces between front legs and corresponding rear legs; a lower plate to which the center member and the legs are welded and fixed; a center front plate welded and fixed to a front face side of the center member and the lower plate; a center rear plate welded and fixed to a rear face side of the center member and the lower plate; a pair of blade support brackets disposed on the center front plate; and a cylinder support bracket for a blade actuating cylinder; wherein the center member comprises a circular base for supporting the upper rotating body in a central area of the metal sheet and is formed to have a substantially reverse square U-shaped cross-section having straight folding portions that are axisymmetrical relative to a center line extending in a front and rear direction of the center member; wherein each of the legs formed separately from the center members has a substantially reverse U-shaped cross-section by bending; wherein the lower plate has an approximate X shape which is pronged in two in the front and rear direction on both right and left sides and has an isosceles trapezoidal shape in a lateral cross-section by bending; and wherein one end of each of the legs is welded and fixed to a corresponding bent side face of the center member.

Another main feature of the center frame according to the present invention is characterized in that the lower plate has welding margins in welding portions where the legs, the center member, and the lower plate are to be welded.

Another main feature of the center frame according to the present invention is characterized in that each of the bending portions of the center member is formed along straight lines connecting an outermost end edge side of the corresponding blade support bracket and the corresponding periphery of the circular base.

Another main feature of the center frame according to the present invention is characterized in that a front end of the center member extends so as to cover an upper portion of the cylinder support bracket.

Another main feature of the center frame according to the present invention is characterized in that the tips of pronged lower plate have shapes that become broader toward the front and/or rear.

Another main feature of the center frame according to the present invention is characterized in that a bracket lower plate securely welded and fixed to an underside face of the cylinder support bracket and to the internal faces of the blade support brackets is securely welded and fixed to the center front plate so as to hold the center front plate between the lower plate and the bracket lower plate itself.

Another main feature of the center frame according to the present invention is characterized in that, in left and right ends of the center front plate, the welding and fixing of the center front plate and the center member and the welding and fixing of the center front plate and the corresponding blade support bracket are achieved by a continuous weld bead.

Additionally, in a method according to the present invention for manufacturing a center frame in a crawler tractor, the main feature of the method is characterized by comprising steps of: bending left and right sides of a lower plate of an approximate X shape in a plan view so that the lower plate has a substantially isosceles trapezoidal shape in a lateral cross-section; bending a center member along straight lines so as to have a substantially reverse square U-shaped cross-section, the center member being made of a metal sheet and having a circular base for supporting an upper rotating body in a central area of the center member, and each of the straight line connecting an outermost end edge side of corresponding one of a pair of blade support brackets disposed at a front face portion of the center member and corresponding periphery of the circular base; bending each of legs so as to have a substantially reverse U-shaped lateral cross-section, the legs connecting the center member and crawler frames disposed on left and right sides of the center member; and welding and fixing the pair of blade support brackets to the left and right sides of the center member and welding and fixing a cylinder support bracket for a blade actuation cylinder to a center portion of the center front plate; wherein the steps are performed in any suitable order and the method further comprising the steps of: disposing, welding and fixing the center member, the legs, the center front plate, and a center rear plate to the lower plate; and welding and fixing the legs to the corresponding bent side faces of the center member.

Effects of the Invention

The present invention makes it possible to manufacture a center member, legs, and a lower plate easily and accurately without special manufacturing apparatus by bending sheet metal. The lower plate is formed in a substantially isosceles trapezoidal shape in a lateral cross-section by bending. Accordingly, a configuration that makes objects, such as stones and wood, less likely to hit the lower plate during the crawler tractor's traveling or working on uneven ground can be obtained by a simple operation such as bending.

The lower plate has an approximate X shape, which has two prongs on each of the left and right sides of the lower plate. Each pair of prongs points in separate directions, toward the front and the back. Accordingly, mud and suchlike flung upward during the crawlers tractor's traveling or working falls in the spaces between the front and rear legs, and is thus less liable to accumulate on the legs. Further, the lower plate is formed in a substantially isosceles trapezoidal shape in a lateral cross-section such that, with the center frame attached to the crawler frame, the legs incline downward from the center member to the crawler frame.

Further, the cross-section of the leg has a substantially reverse U shape, thus mud and suchlike which fall on the legs can easily slide off the legs, and is thus less liable to accumulate on the legs and hence on the center frame. This makes it easy to wash the center frame.

Each of the legs is securely welded to the corresponding bent side of the center member. The bending portions along which the sides of the center member are bent are formed integrally with the center member. Accordingly, the entire center member may be subject to, via no welded portions or suchlike, force exerted on the bending portions from the legs. This has an advantage in terms of strength, compared to a configuration where the bending parts are formed separately from the center member.

EXPLANATIONS OF REFERENCE NUMERALS

Figure 1:
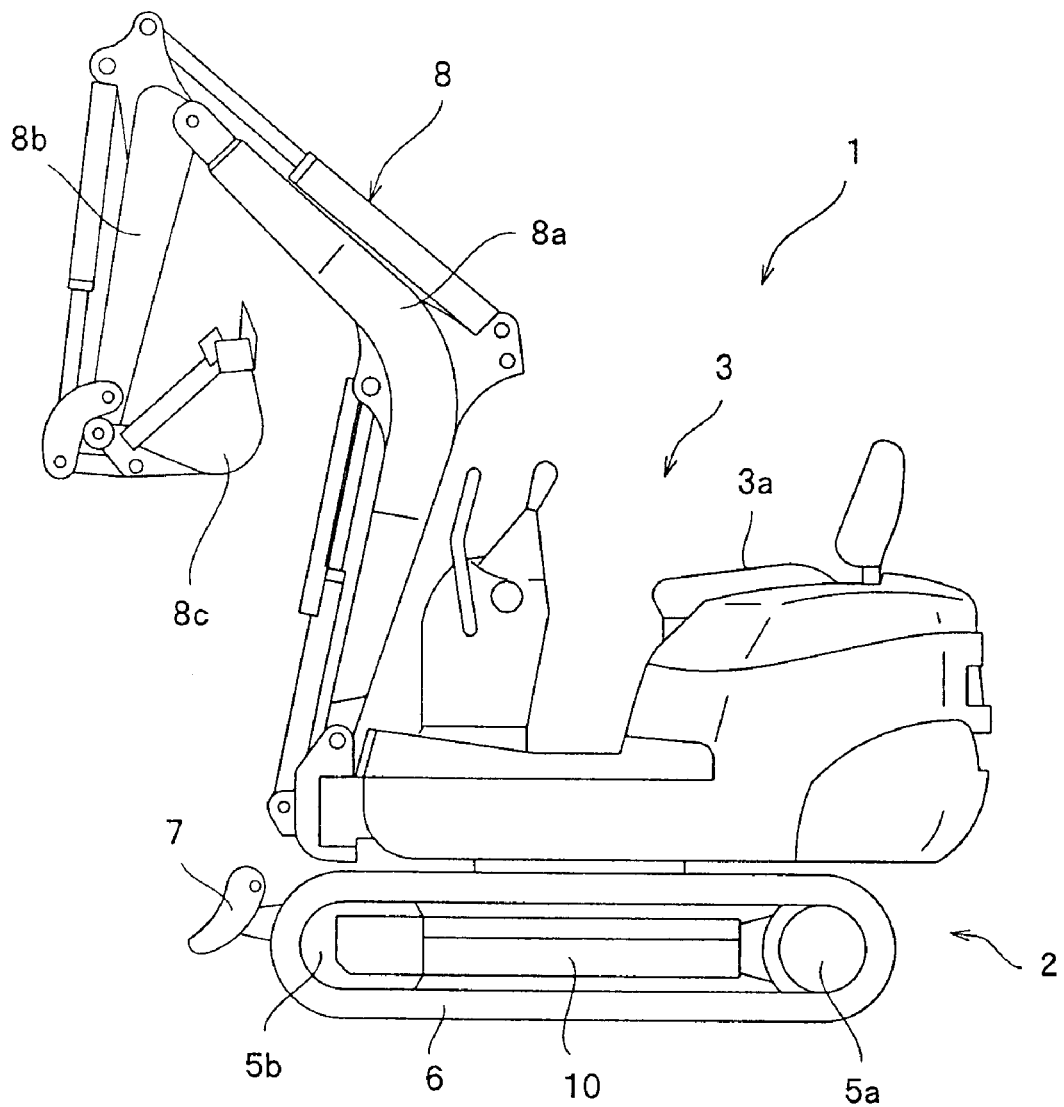
FIG. 1 is a side view of a hydraulic shovel according to an embodiment of the present invention (first embodiment)

1: Hydraulic shovel
2: Undercarriage
3: Upper rotating body
4: Track frame
9a: Blade support bracket
9b: Cylinder support bracket
10: Center member
11: Circular base
12: Center hole
13: Front leg
14: Rear leg
15: Crawler frame
18: Lower plate
18d: Bending portion
20: Center frame
22: Center front plate
23: Center rear plate
24: Bending portion
24a: Bent side
27: Weld bead
28: Bracket lower plate
50: Central portion
51: Crawler frame
52: Front leg
53: Rear leg
54: Upper plate
55: Lower plate
56: Side plate
59A: Through-opening
60: Intermediate frame
63: Side plate
65: Front leg
66: Rear leg
67: Lower plate
70: Rack frame
71: Center member
72: Front leg
73: Rear leg
74: Crawler frame
75: Lower plate
76: Center frame

BEST MODE FOR CARRYING OUT THE INVENTION

A preferred embodiment of the present invention will hereinafter be described in detail with reference to the accompanying drawings. The configuration of a center frame according to the present invention will be described using as an example the configuration of the center frame of a hydraulic shovel, which is a typical construction machine. However, the configuration of the center frame according to the present invention is not limited to that of a hydraulic shovel only but can effectively be applied to a center frame for any machine designed for construction engineering, civil engineering, or agricultural tasks, or any vehicle designed for traveling, conveying, etc.

Besides the shape and disposition described below, any other shape or disposition that achieves the objects of the present invention may be used. Therefore, the present invention is not limited to the embodiment described below only and can be variously changed or modified.

First Embodiment

Figure 2:
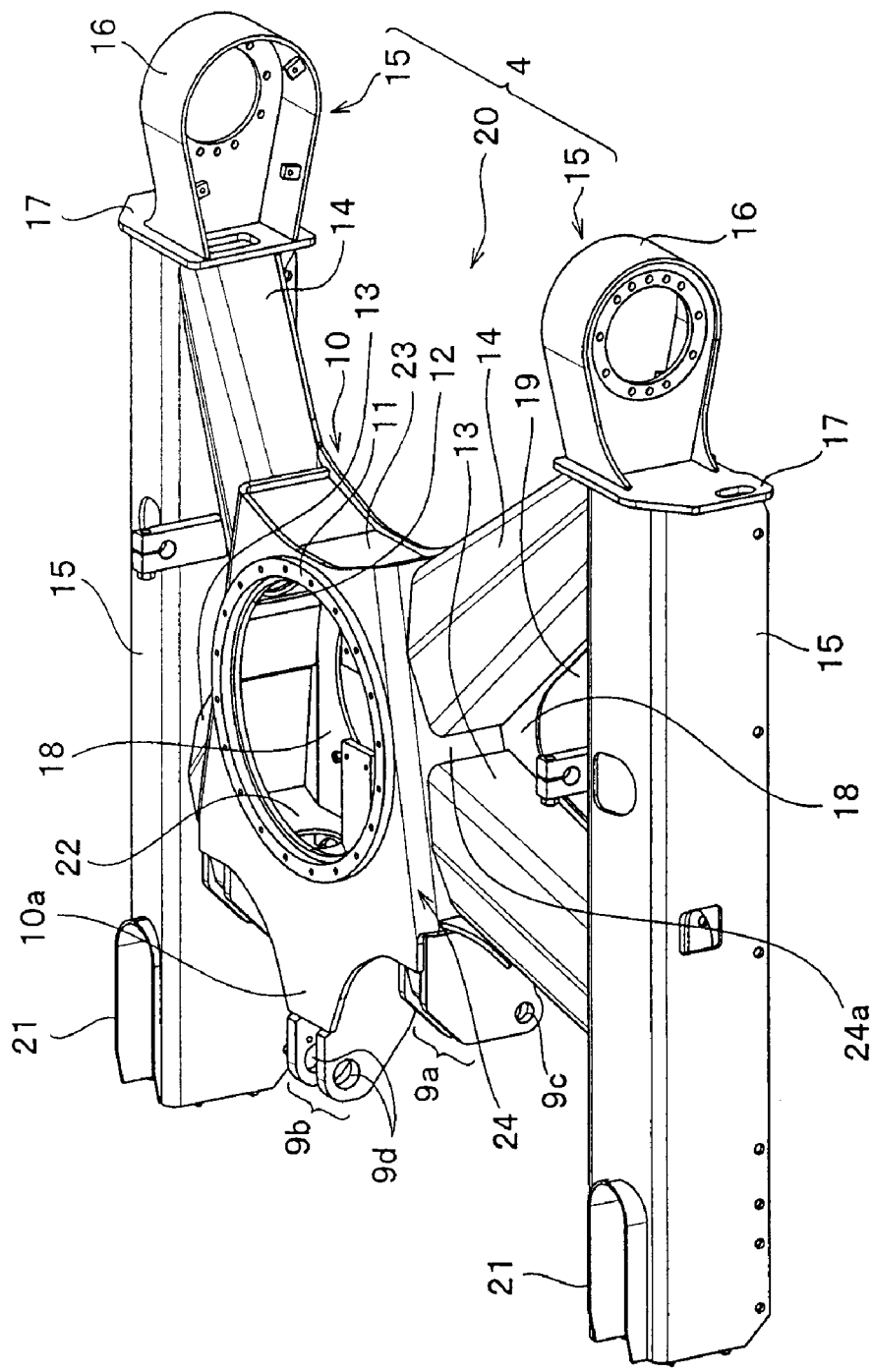
FIG. 2 is a perspective view, in a plan view, of the entire track frame (first embodiment)
Figure 3:
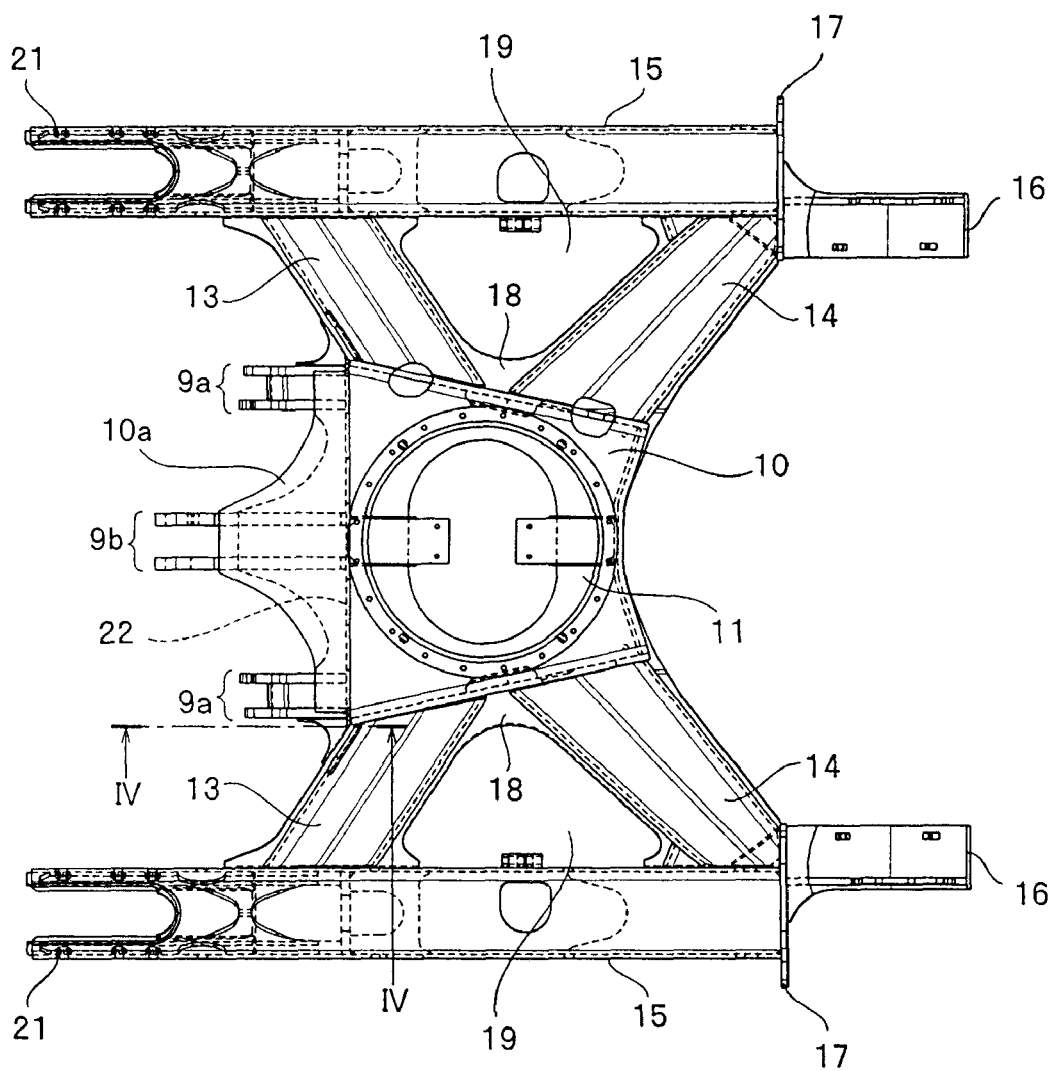
FIG. 3 is a plan view of the track frame (first embodiment)
Figure 4:
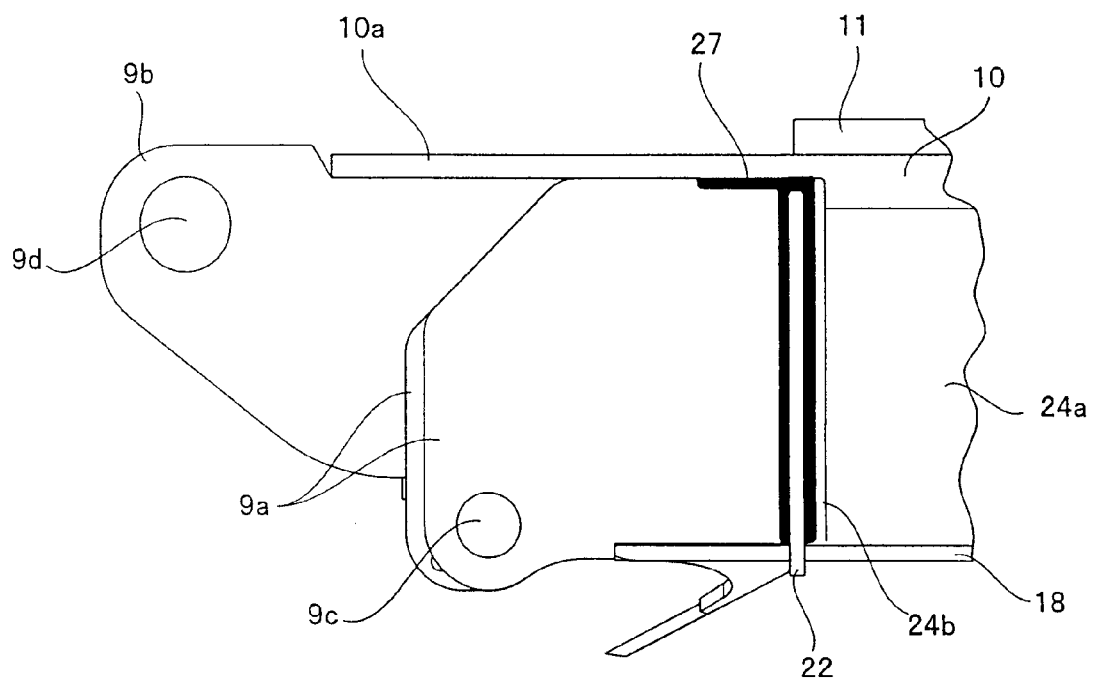
FIG. 4 is a sectional view taken along the line IV-IV shown in FIG. 3 (first embodiment)
Figure 5:
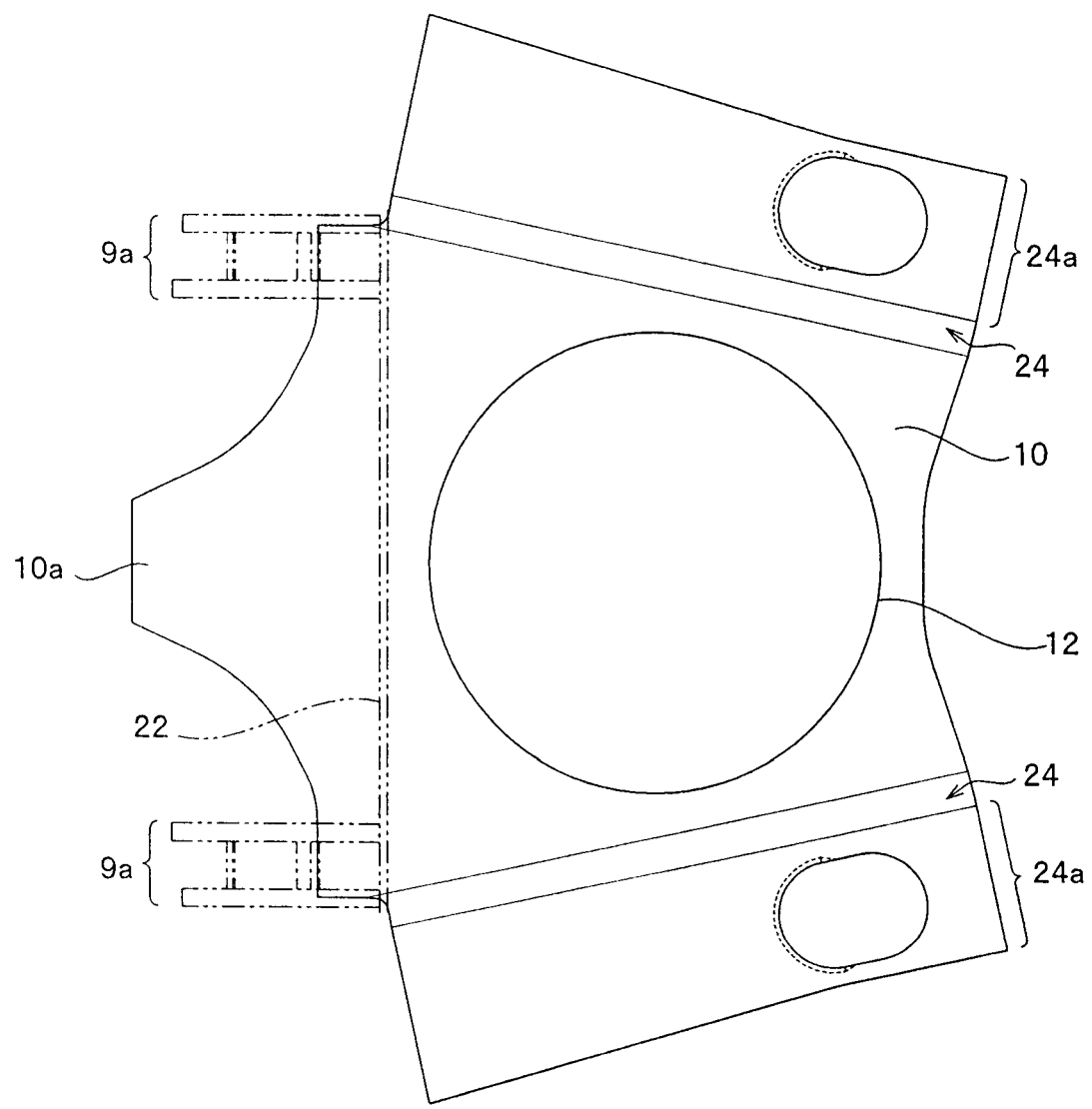
FIG. 5 is a plan view of a center member before this member is bent (first embodiment)
Figure 6:
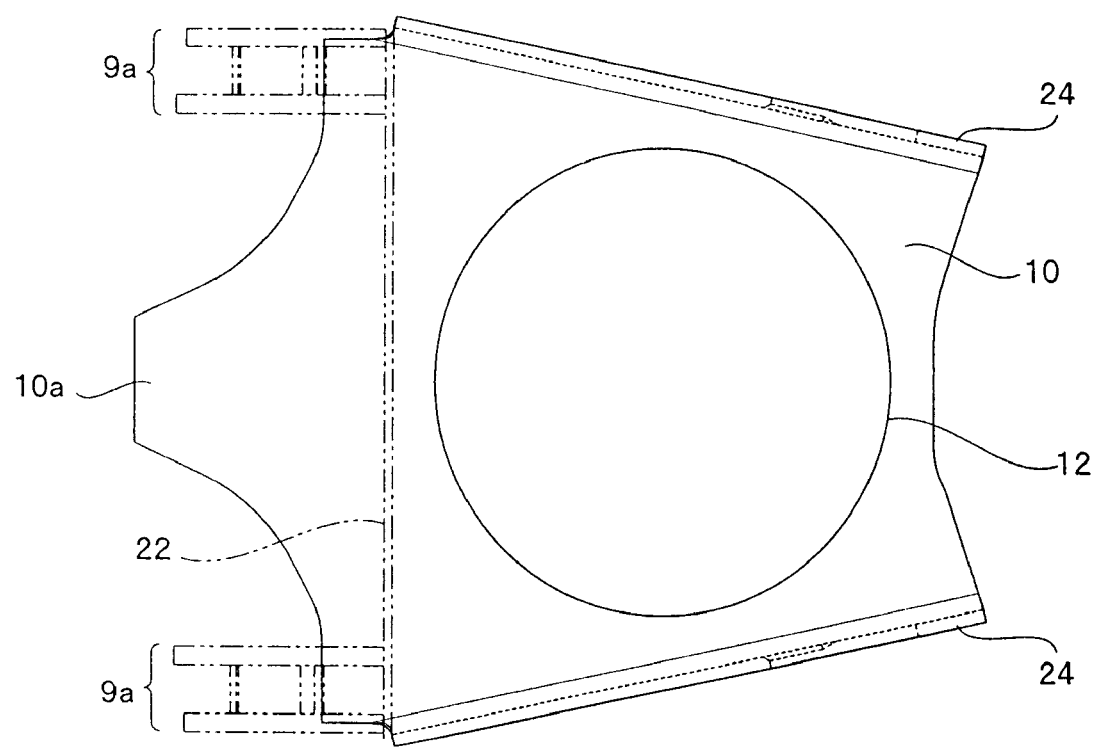
FIG. 6 is a plan view of the center member after this member is bent (first embodiment)

FIG. 1 is a side view of a hydraulic shovel according to the first embodiment of the present invention. FIG. 2 is a perspective view, in a plan view, of the entire track frame that has a center frame and crawler frames according to the present invention, and FIG. 3 is a plan view of the track frame. FIG. 4 is a sectional view taken along the line IV-IV shown in FIG. 3. FIG. 5 is a plan view of a center member before this member is bent. FIG. 6 is a plan view of the center member after this member is bent.

Figure 7:
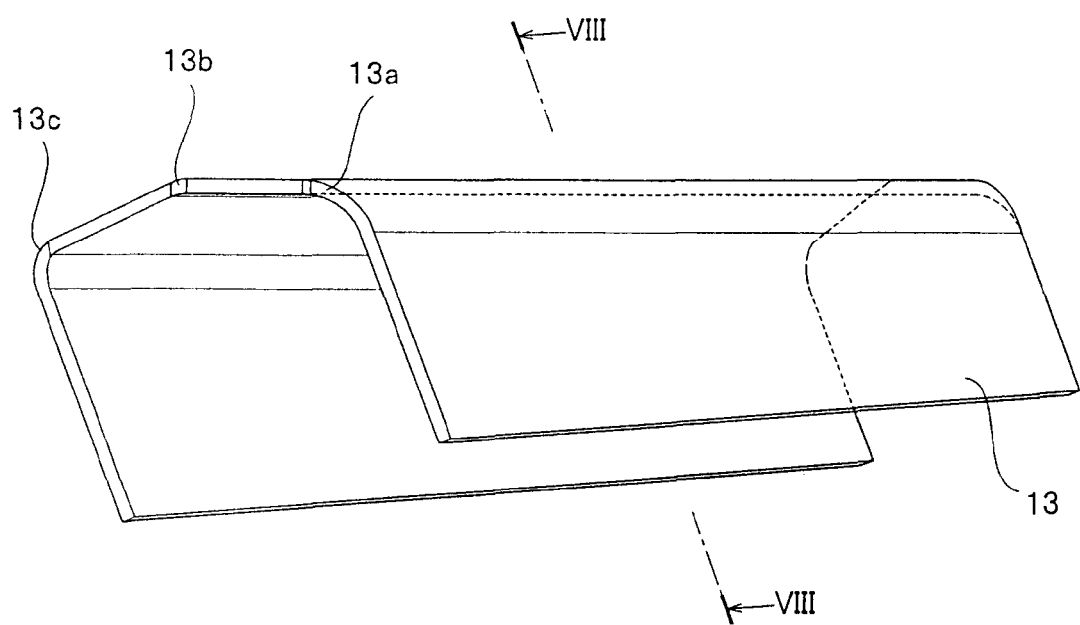
FIG. 7 is a perspective view of the side of each of the entire front legs (first embodiment)
Figure 8:
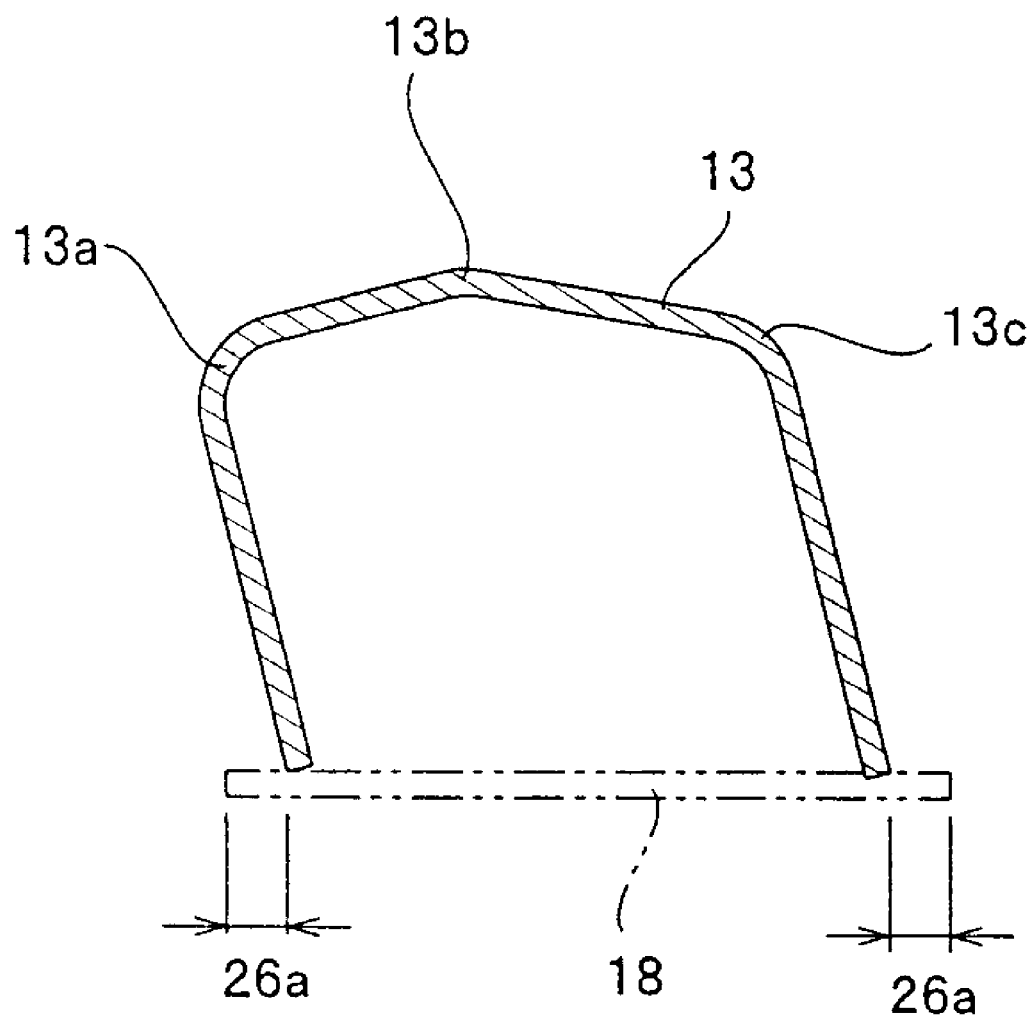
FIG. 8 is a sectional view taken along the line VIII-VIII in FIG. 7, and showing the disposed position of a lower plate (first embodiment)
Figure 9:
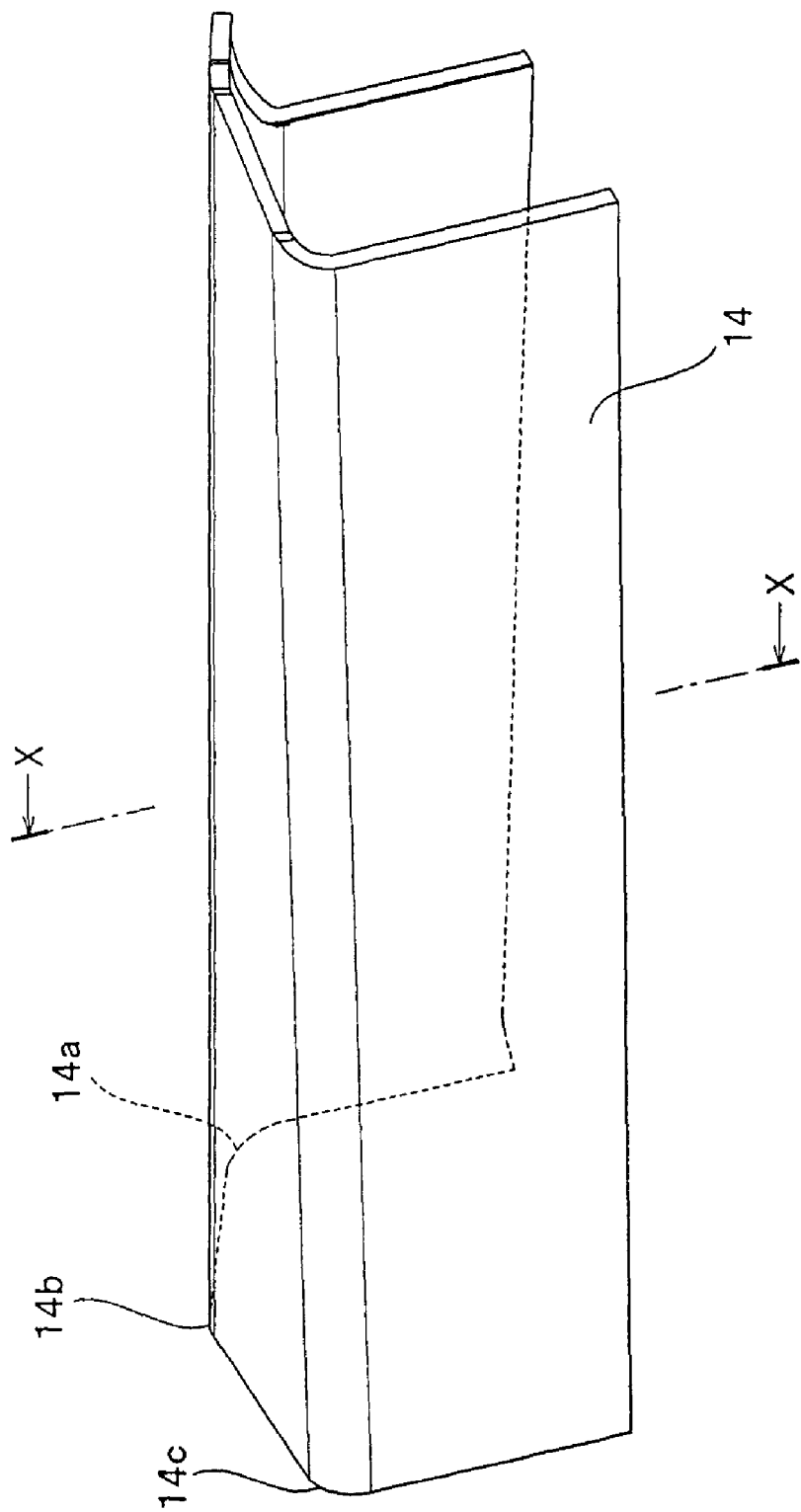
FIG. 9 is a perspective view of the entire side of each of the rear legs (first embodiment)
Figure 10:
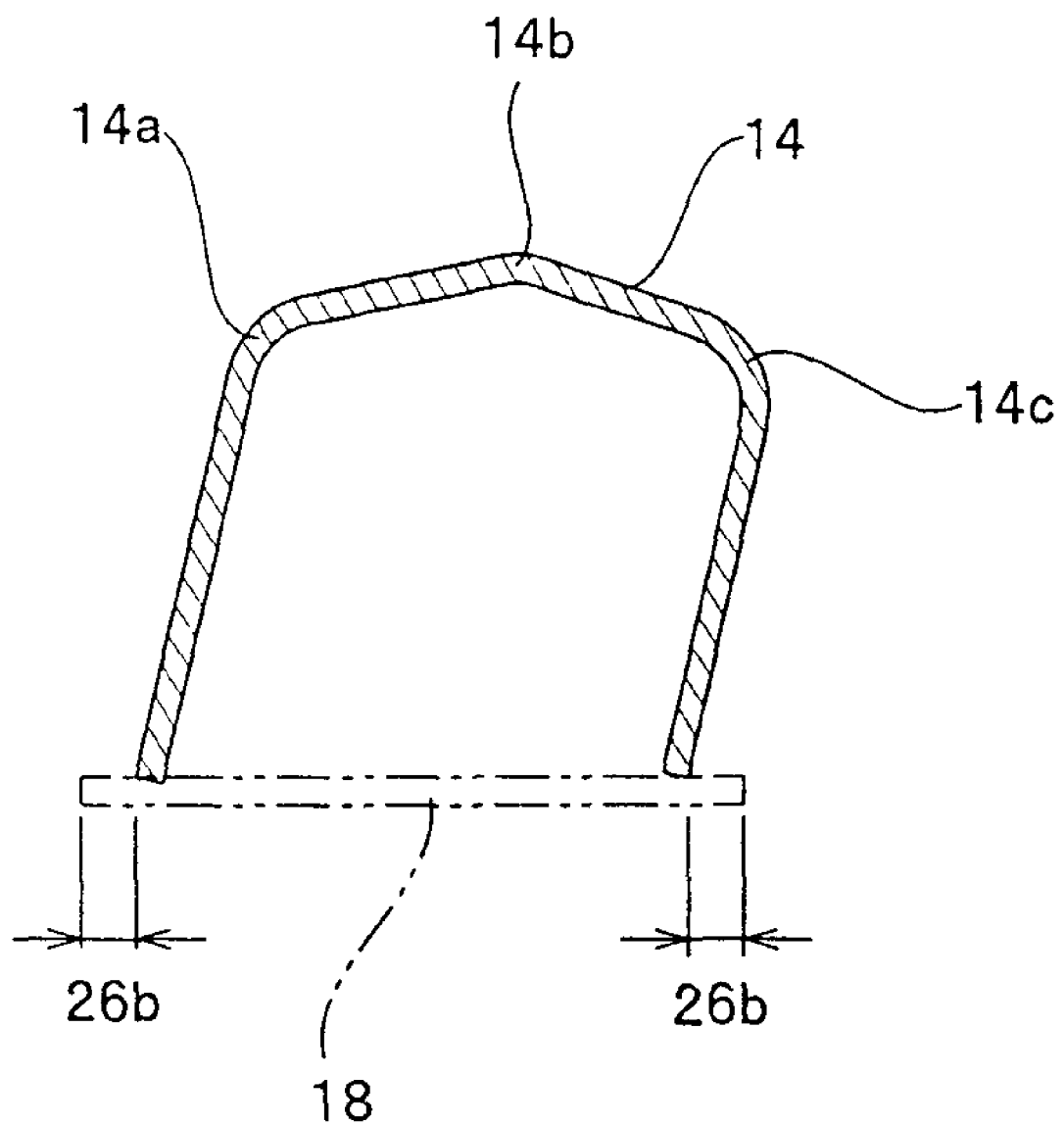
FIG. 10 is a sectional view taken along the line X-X in FIG. 9, and showing the disposed position of the lower plate (first embodiment)

FIG. 7 is a perspective view of the side of each of the entire front legs. FIG. 8 is a sectional view taken along the line VIII-VIII in FIG. 7, and showing the disposed position of a lower plate. FIG. 9 is a perspective view of the entire side of each of the rear legs. FIG. 10 is a sectional view taken along the line X-X in FIG. 9, and showing the disposed position of the lower plate.

Figure 11:
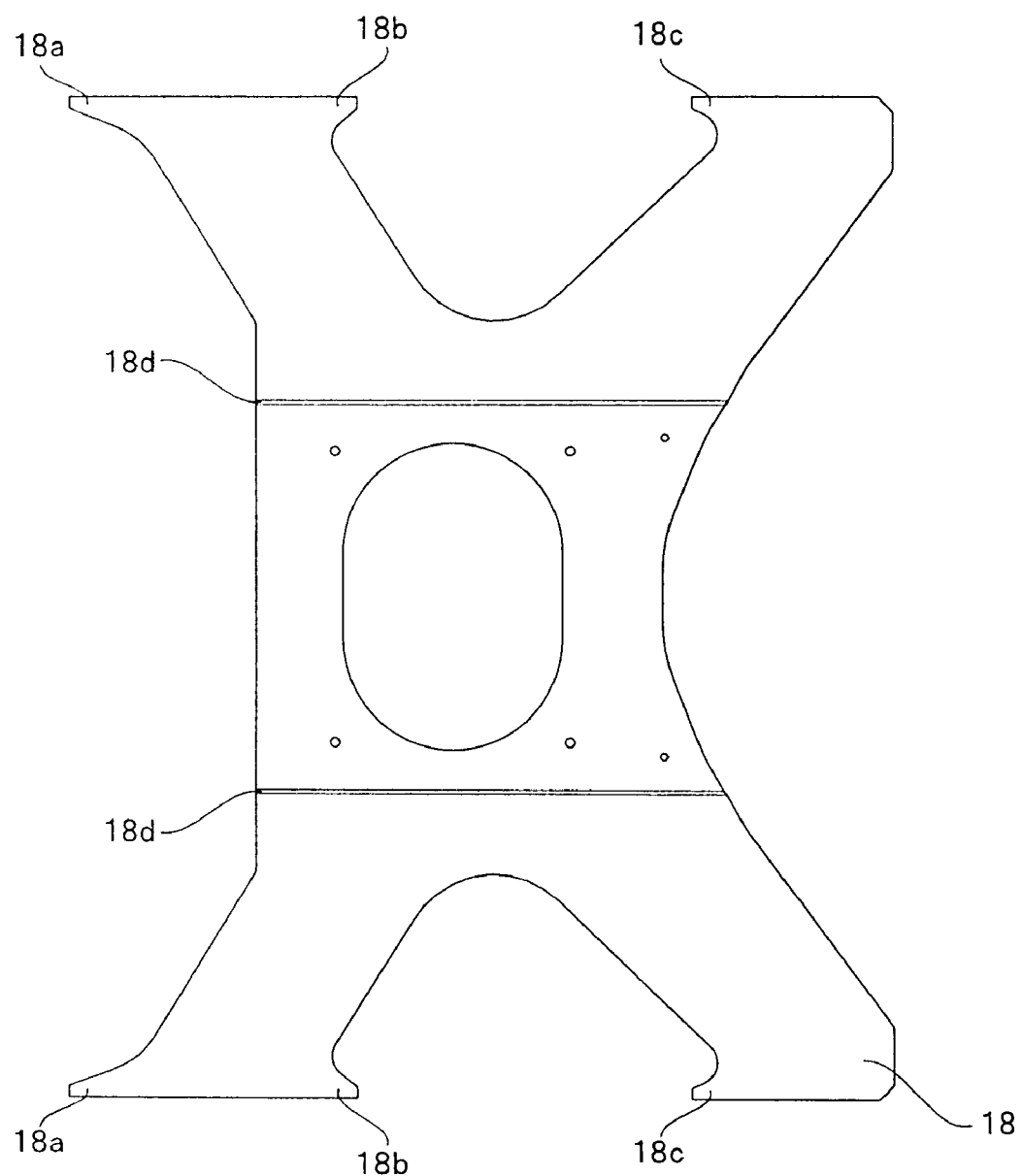
FIG. 11 is a plan view of the lower plate before this plate is bent (first embodiment)
Figure 12:
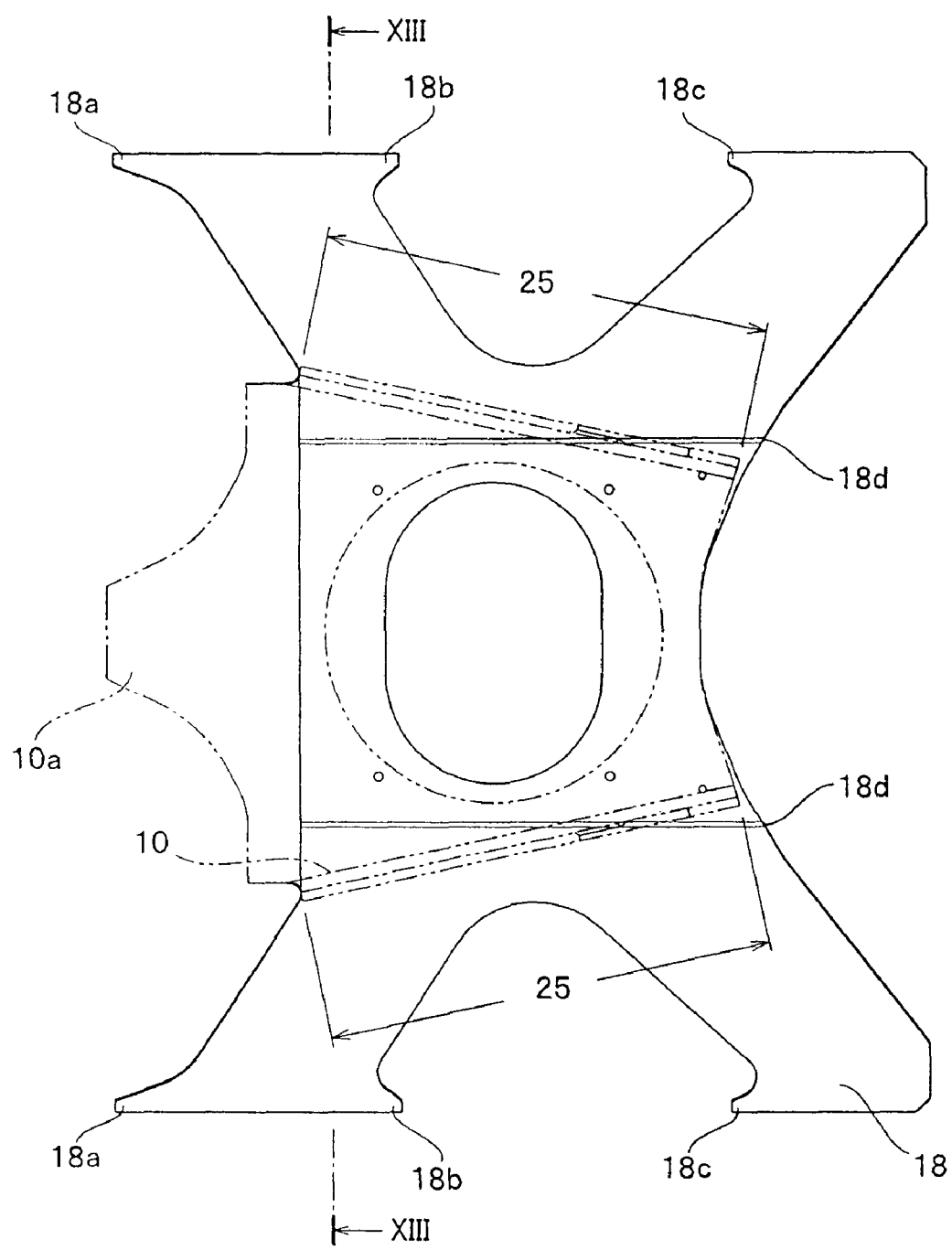
FIG. 12 is a plan view of the bent lower plate and shows the disposed position of the center member (first embodiment)
Figure 13:
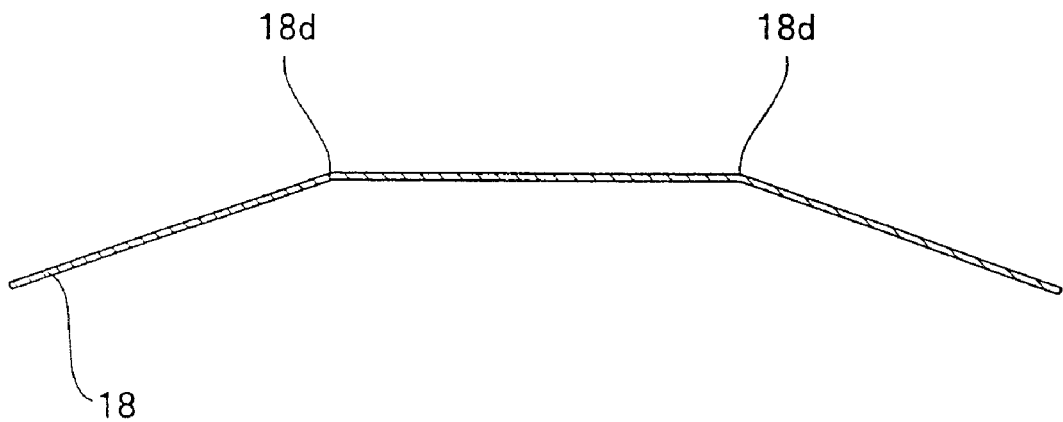
FIG. 13 is a sectional view of the lower plate, taken along the line XIII-XIII shown in FIG. 12 (first embodiment)
Figure 14:
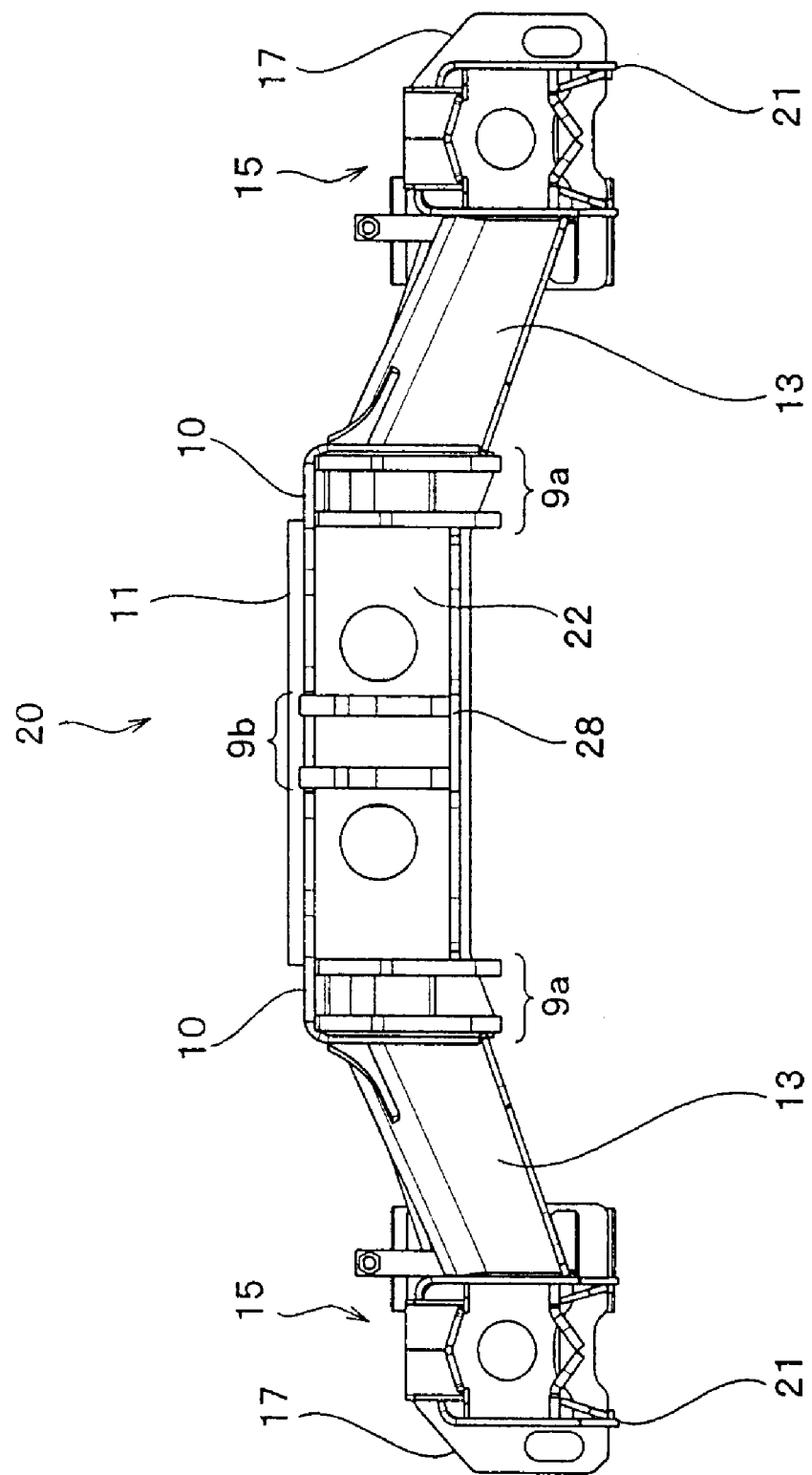
FIG. 14 is a front view of the track frame (first embodiment)
Figure 15:
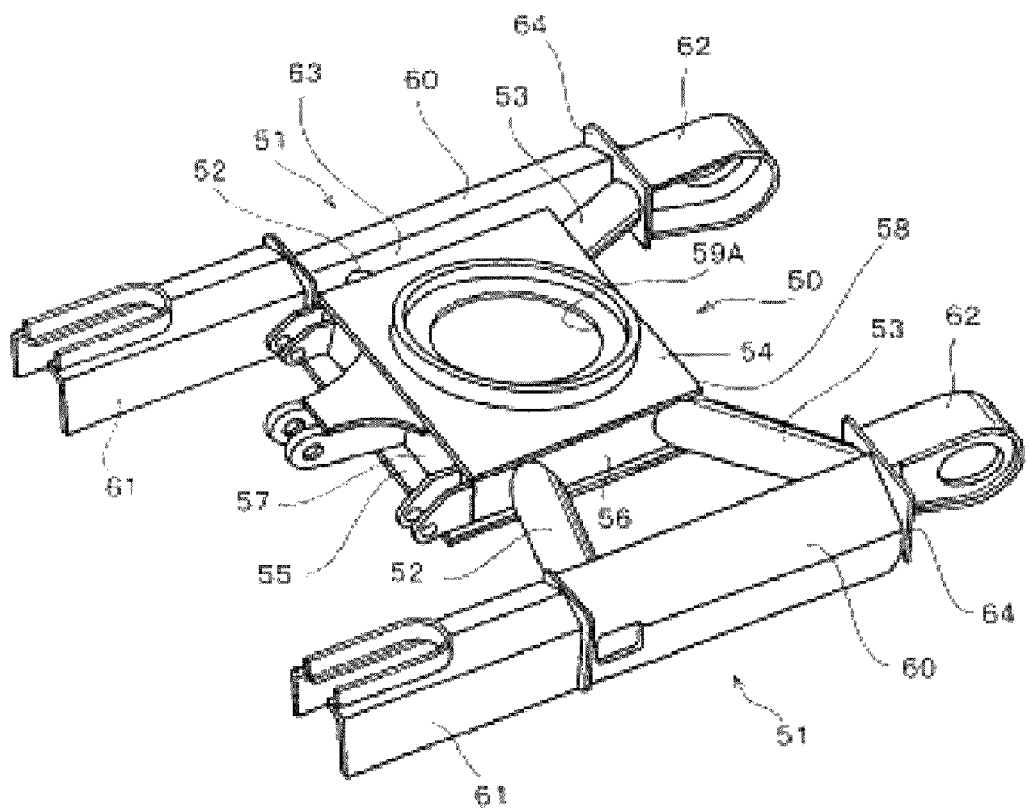
FIG. 15 is a perspective view of the entire track frame (conventional example)
Figure 16:
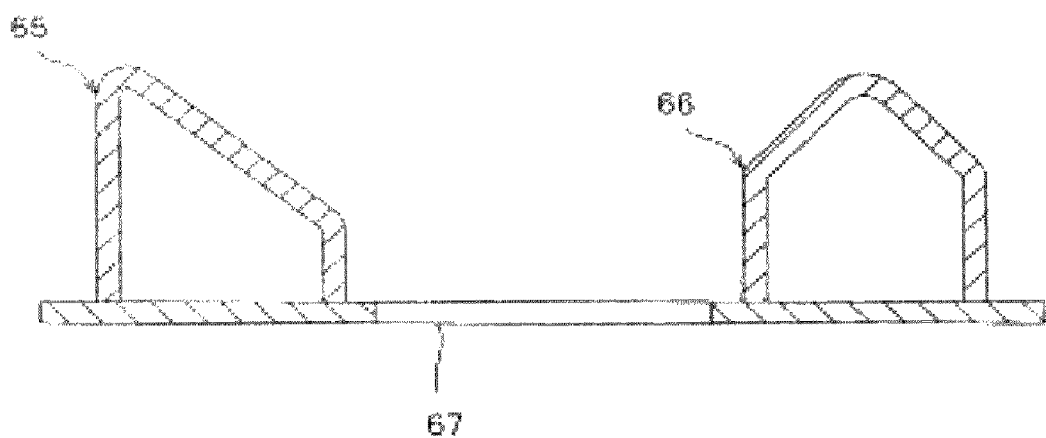
FIG. 16 are cross-sectional views of front and rear legs (conventional example)
Figure 17:
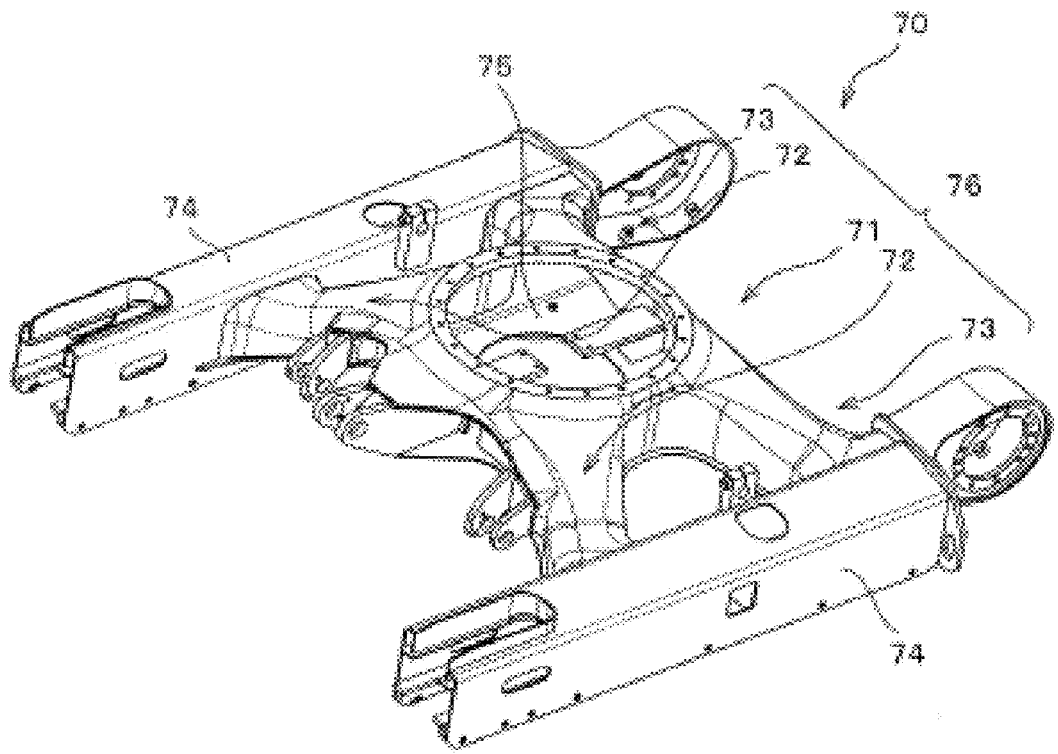
FIG. 17 is a perspective view of the entire track frame (conventional example).

FIG. 11 is a plan view of the lower plate before this plate is bent. FIG. 12 is a plan view of a bent lower plate and shows the disposed position of the center member. FIG. 13 is a sectional view of the lower plate, taken along the line XIII-XIII shown in FIG. 12. FIG. 14 is a front view of the track frame incorporating center and crawler frames according to the present invention.

As shown in FIG. 1, the hydraulic shovel 1 includes an undercarriage 2, and an upper rotating body 3 installed on the undercarriage 2 so as to rotate freely. The undercarriage 2 has: a driving wheel 5a and a following wheel 5b, one in the front and the other in the back with a space between them; crawlers wound around the wheels 5a and 5b so as to rotate freely; and a blade 7. The blade 7 is installed on the front of the undercarriage 2 and freely swings upwards or downwards so as to remove soil or level the ground.

The upper rotating body 3 has work equipment 8, which freely swings by means of oil pressure, on the front and a driver's seat 3a on the back. The work equipment 8 has a boom 8a, an arm 8b attached to the leading end of the boom 8a, and a bucket 8c attached to the leading end of the arm 8b. In the example shown in FIG. 1, the driver's seat 3a is neither disposed in a cabin nor covered by a canopy. However, it may be so disposed in either.

As shown in FIG. 2, the track frame 4 includes a center frame 20, and the crawler frames 15, one on the left and the other on the right. Each of the crawler frames 15 has: a body extending along the longitudinal length of the crawler frame and having a gate-shaped cross-section; a driving wheel support 16 supported at one end of the body via a plate 17; and a following wheel support 21 formed at the other end of the body.

The center frame 20 includes: a center member 10; front legs 13, one on the left and the other on the right, and rear legs 14, one on the left and the other on the right; a lower plate 18 disposed on the undersides of the center member 10 and legs; a center front plate 22 disposed on the front of the center member 10; blade support brackets 9a disposed on the left and right parts of the center front plate 22; a cylinder support bracket 9b disposed in the middle of the center front plate 22; and a center rear plate 23 disposed on the rear of the center member 10.

The center member 10 has a center hole 12 made in its center, and a circular base 11 is disposed along the peripheral edge of the center hole 12.

The front legs 13 and the rear legs 14 are securely welded to the sides 24, formed by folding the center member 10 along folding portions 24a, such that there are spaces between the front legs 13 and the corresponding rear legs 14.

The center member 10, and the front legs 13 and rear legs are securely welded to the surface of the lower plate 18.

The center front plate 22 is disposed on the front of the center member 10, and securely welded to the center member 10 and the lower plate 18.

The center rear plate 23 is disposed on the rear of the center member 10, and securely welded to the center member 10 and the lower plate 18. Thus, a box structure can be formed from the center member 10, center front plate 22, center rear plate 23, and lower plate 18, thereby making it possible to increase the strength of the center frame.

Formed in the cylinder support bracket 9b is a mounting hole 9d for mounting a cylinder that operates the blade (not shown). Formed in the blade support brackets 9a are mounting holes 9c that support the blade 7 such that the blade swings freely.

As shown in FIGS. 2 and 3, the front end of the center member 10 includes an extension 10a covering the upper portion of the cylinder support bracket 9b, thereby preventing entry of mud or suchlike into gaps in the cylinder support bracket 9b, thus ensuring the smooth operation of the cylinder.

As shown in FIG. 3, the center front plate 22 is disposed on the front of the center member 10. As shown in FIG. 4, the center front plate 22 is securely welded to the center member 10, the lower plate 18, and the front end 24b of the bent side 24a of the center member 10. As shown in FIG. 3, the cylinder support bracket 9b is securely welded to the middle of the center front plate 22, and the blade support brackets 9a are securely welded to the left and right sides of the center front plate 22.

In this case, the left and right ends of the center front plate 22 are processed such that the secure welding of the center front plate 22 and the center member 10 (in particular, the front end 24b of each bent side 24a) and the secure welding of the center front plate 22 and the corresponding blade support bracket 9a may be achieved integrally by a continuous weld bead 27 (indicated by the thick line), as shown in FIG. 4. This eliminates discontinuous welding susceptible to stress concentration. Accordingly, the strength of a secure weld can be improved, and the stress concentrations which may occur in a discontinuous weld can be prevented.

Incidentally, in FIG. 4, the front end 24b of the bent side 24, which is covered by the weld bead 27 and center front plate 22 and therefore is not actually visible, is shown here to facilitate the understanding of the configuration.

As shown in FIGS. 5 and 6, the center member 10 has the straight bending portions 24 that are axisymmetrical relative to the center line (not shown) extending along the longitudinal length of the center member 10. The center member 10 is so formed as to have a substantially reverse square U-shaped cross-section. The bending portions 24 are formed along straight lines connecting the outermost end edges of the blade support brackets 9a (left and right) and the corresponding peripheral edges of the circular base 11 (not shown) disposed along the peripheral edge of the center hole 12.

The interval between the blade support brackets 9a is determined by the blade size, and is generally greater than the diameter of the circular base 11. Accordingly, the interval between the left and right bending portions 24 narrows toward the back.

The bending portions 24 thus formed can be disposed close to the circular base 11, compared to where bending portions are parallel to each other with an interval equal to that between the outermost end edges of the blade support brackets 9a. Accordingly, the sides 24a can efficiently bear the weight of the upper rotating body 3 together with the center front and rear plates.

The present invention can reduce the area (other than that required to mount the circular base) of the center member upper part formed by bending, especially the rear area of the center member upper part, compared to where the bending portions are parallel to each other from the outermost end edges of the blade support brackets disposed left and right. The present invention reduces the area of the surface of the center member 10 except the center hole 12, especially the rear area of this surface.

This configuration prevents the surface of the center member 10 from being curved inward by the weight of the upper rotating body 3.

Holes made in the rear parts of the bent sides 24a are covered by the corresponding rear legs but are provided to install power cable (usually, hydraulic pipes) for driving the drive wheel.

Each of the front legs 13 is formed by bending a metal sheet along the bending portions 13a, 13b, and 13c so as to have a substantially reverse U-shaped cross-section with a vertex, as shown in FIG. 8. Similarly, each of the rear legs 14 is formed by bending a metal sheet along the bending portions 14a, 14b, and 14c so as to have a substantially reverse U-shaped cross-section with a vertex, as shown in FIG. 10.

As shown in FIG. 11, the lower plate 18 has an approximate X shape, in a plan view, divided into a pair of prongs in sideways in which the left side has two prongs and the right side also has two prongs. In addition, the tips of each of the pairs of prongs of the lower plate 18 have portions 18a, 18b, and 18c, which become broader toward the front and/or rear. By broadening the tips of the lower plate 18, stress acting on the tips and crawler frames 15 securely welded can be dispersed and received over the entire broad tips of the lower plate 18. This configuration prevents stress concentration and increases the strength of the securely welded parts.

In addition, since the lower plate 18 has an approximate X shape, empty spaces 19 can be left between the front legs 13 and the corresponding rear legs 14 after the mounting of these legs. This configuration encourages mud, etc., splashed during traveling or operation to fall through the spaces. Accordingly, both these empty spaces and the front and rear legs of the approximate inverted U-shapes with vertices discourage the accumulation of mud, etc., on the center frame.

Further, the left and right sides of the lower plate 18 are bent along the binding portions 18d and 18d so that the lower plate 18 has an isosceles trapezoidal shape in a lateral cross-section, as shown in FIG. 13. Thus, with the center frame 20 attached to the crawler frames 15, the front legs 13 and rear legs 14 incline downward from the center member 10 toward the corresponding crawler frames 15, as shown in FIG. 14.

As shown in FIGS. 8 and 10, each of the legs has a substantially reverse U-shaped cross-section with the vertex and faces inclining towards the front and rear (i.e., the left and right as viewed in cross-sectional FIGS. 8 and 10). This encourages mud and suchlike splashed on the legs easily to slide and fall off the legs. This makes mud less likely to accumulate on the lower plate 18 and hence the center frame, thus facilitating the washing of the center frame.

FIG. 8 is a sectional view taken along the line X-X shown in FIG. 7 and shows the disposed position of the lower plate. As shown in FIG. 8, the lower plate 18 may have areas in which weld metal is to be placed, namely welding margins 26a, when the corresponding front legs 13 are securely welded to the lower plate 18. Similarly, as shown in FIG. 10, which is a sectional view taken along the line X-X shown in FIG. 9, the lower plate may have areas in which weld metal is to be placed, namely welding margins 26b, when the corresponding rear legs are securely welded to the lower plate 18.

As shown in FIG. 12 in which the center member 10 placed on the lower plate 18 bent along the bending portions 18d is shown by imaginary lines, the lower plate may have welding margins 25 where the lower plate and the center member are to be securely welded together. This makes it possible to weld the legs and the center member 10 to the lower plate 18 from above, thus improving welding efficiency.

As shown in FIG. 14, the bracket lower plate 28 is securely welded to the center front plate 22, the underside of the cylinder support bracket 9b, and the internal faces of the blade support brackets 9a. Instead of this structure, the bracket lower plate 28 may be securely welded to the center front plate 22 so as to hold the center front plate 22 between the lower plate 18 and the bracket lower plate 28 themselves.

In the foregoing configuration, force exerted on the blade support brackets 9a and cylinder support bracket 9b due to earth removal work is efficiently transmitted, via the bracket lower plate 28, to the lower plate 18 disposed in the same plane as the lower plate 28. This prevents stress concentration on the securely welded part of the center front plate 22 and improves the strength of the center frame.

The center frame according to the present invention can be manufactured in the manner described below.

A center member 10 in the form of a flat plate is formed through sheet metal processing such that a center hole 12 is made in the central area of an iron plate and an circumferential shape as shown in FIG. 5 is formed by precise laser processing or the like.

Subsequently, the left and right sides of the center member are bent at equal angles along left and right straight lines (i.e., bending portions 24) so as to be axisymmetrical relative to the center line (not shown) extending toward the front and back of the center member 10. These left and right straight lines are formed by connecting the outermost end edges of the blade support brackets 9a disposed on the front of the center member 10 and corresponding periphery of the center hole 12. The center member 10 thus forms a substantially reverse square U-shaped cross-section.

As for each of the front legs 13, a flat plate is first formed through sheet metal processing so as to have such an circumferential shape that one of the end faces of the iron plate bent by precision laser processing is disposed in contact with the corresponding bent side 24a of the center member 10 and the other end face is disposed in contact with the corresponding side of the crawler frame 15. Subsequently, bending processing is performed such that the iron plate is bent along the bending portions 13a, 13b, and 13c extending along the longitudinal length of the front leg, as shown in FIG. 7. Thus, each of the front legs 13 forms a substantially reverse U-shaped cross-section with a vertex, as shown in FIG. 8.

To make each of the rear legs 14, a flat plate is first formed, through sheet metal processing, to have such an circumferential shape that one of the end faces of the iron plate bent by precision laser processing can be disposed in contact with the corresponding bent side 24a of the center member 10 and the other end face is disposed in contact with the part between the corresponding plate 17 and the rear part of the corresponding crawler frame 15. Subsequently, bending processing is performed such that the iron plate is bent along the bending portions 14a, 14b, and 14c extending along the longitudinal length of the rear leg 14, as shown in FIG. 9. Thus, each of the rear legs 14 forms a substantially reverse U-shaped cross-section with a vertex, as shown in FIG. 10.

As for the lower plate 18, a flat plate is first formed through sheet metal processing such that an iron sheet is subjected to precision laser processing or suchlike so as to have an approximate X circumferential shape, in a plan view, as shown in FIG. 11, in which the tips of the left two prongs and right two prongs have portions 18a, 18b, and 18c, which become broader.

Subsequently, the left and right sides of the lower plate 18 are bent at an equal angle along the left and right bending straight lines (bending portions 18d) that are parallel to each other and axisymmetrical relative to the center line (not shown) extending along the center member 10. Thus, the lower plate 18 forms an isosceles trapezoidal shape in a lateral cross-section, as shown in FIG. 13.

As for the center front plate 22, a flat plate is formed through sheet metal processing such that precision laser processing or suchlike is performed to form an circumferential shape so that the center front plate 22 is located on the front of the center member 10 and defines a space enclosed by the center member 10 and lower plate 18, as shown in FIG. 14. Specifically, to define this space, the center front plate 22 projects beyond the underside of the lower plate 18 toward the top of the center front plate 22, which top is in contact with the extension 10a, as shown in FIG. 4. In addition, the center front plate 22 is wide enough to be at least overlapped in contact with the ends 24b of the bent sides 24a of the center member 10.

In FIG. 4, a substantially triangular part extending leftward from the lower end of the center front plate 22 and having one curved face indicates the lower end of one of the pair of blade support brackets 9a (shown on the left side in FIG. 4) disposed inside the vehicle. Also in FIG. 4, a substantially rectangular part continuing leftward from the lower end of the center front plate 22 is a section of reinforcement provided for the connection between the blade support bracket 9a disposed on the outside of the vehicle and the end of the corresponding front leg 13, which are shown in FIG. 3.

Subsequently, as shown in FIG. 14, the pair of blade support brackets 9a are securely welded to the center front plate 22, one to its left part and the other to its right part, and the cylinder support bracket 9b is securely welded to the middle of the center front plate 22.

As for the center rear plate 23, a flat plate is first formed through sheet metal processing such that precision laser processing or suchlike is performed to form an circumferential shape so that the center rear plate 23 is located on the rear of the center member 10, as shown in FIG. 2. Bent processing is performed on the center rear plate so that it follows the rear of the center member 10 when the center rear plate 23 is fitted in the space enclosed by the center member 10 and the lower plate 18. Thus, the center rear plate 23 is formed. Since the center member 10, front legs 13, rear legs 14, lower plate 18, etc are formed with high accuracy, high accuracy can also be maintained in post-welding processing of the center frame.

The steps described above can be performed in any suitable order.

The center member 10 is disposed in the central area of the lower plate 18 and securely welded to the area. Subsequently, the center front plate 22 is disposed on the front of the center member 10, and securely welded to the center member 10 and then to the lower plate 18. Further, the center rear plate 23 is disposed on the rear of the center member 10, and securely welded to the center member 10 and then to the lower plate 18.

Next, the front legs 13 are disposed on the center member and on the left and right sides of the center member 10, and securely welded to the lower plate 18. Then, one end face of each of the front legs 13, which is disposed in contact with the corresponding bent side 24a of the center member 10, is securely welded to this bent side 24a.

Similarly, the rear legs 14 are disposed on the lower plate 18 and on the left and right sides of the center member 10, and securely welded to the lower plate 18. Then, one end face of each of the rear legs 14, which is disposed in contact with the corresponding bent side 24a of the center member 10, is securely welded to this bent side 24a.

The order in which the center member 10, center front plate 22, center rear plate 23, front legs 13 and rear legs 14 are disposed and the order in which they are welded are not limited to the examples described above and may be changed as necessity requires.

However, concerning the order in which the center member 10, front legs 13 and rear legs 14 are disposed and the order in which they are welded, it is necessary that the center member 10 be disposed and welded on the lower plate 18 first. If the legs are first disposed and welded to the lower plate, parts of the center members will be covered by the legs and, therefore, cannot be welded to the lower plate.

INDUSTRIAL APPLICABILITY

The technical concept of the present invention can be applied in any apparatus, etc., as long as this technical concept is applied in them.

The invention claimed is:

1. A center frame in a crawler tractor, the center frame comprising:
    a center member made of a metal sheet and supporting an upper rotating body;
    a pair of front legs and a pair of rear legs made of a metal sheet and disposed on each of left and right sides of the center member such that there are spaces between the pair of front legs and the pair of corresponding rear legs;
    a lower plate to which the center member and the pair of front legs and the pair of rear legs are welded and fixed;
    a center front plate welded and fixed to a front face side of the center member and the lower plate;
    a center rear plate welded and fixed to a rear face side of the center member and the lower plate;
    a pair of blade support brackets disposed on the center front plate; and
    a cylinder support bracket for a blade actuating cylinder;
    wherein the center member comprises a circular base for supporting the upper rotating body in a central area of the metal sheet and is formed to have a substantially reverse square U-shaped cross-section having straight folding portions that are axisymmetrical relative to a center line extending in a front and rear direction of the center member;
    wherein each of the legs formed separately from the center members has a substantially reverse U-shaped cross-section by bending;
    wherein the lower plate has an approximate X shape which is pronged in two in the front and rear direction on both right and left sides and the right and left sides are bent to be formed in an isosceles trapezoidal shape in a lateral cross-section, and are bent in the same angle along the straight bending line which is parallel and line-symmetric with the center line in the front and rear direction of the lower plate; and wherein one end of each of the legs is welded and fixed to a corresponding bent side face of the center member.

2. The center frame according to claim 1, wherein the lower plate has welding margins in welding portions where each of the legs, the center member, and the lower plate are to be welded.

3. The center frame according to claim 2, wherein in each of the bending portions of the center member is formed along a straight line connecting an outermost end edge side of the corresponding blade support bracket and a corresponding periphery of the circular base.

4. The center frame according to claim 2, wherein a front end of the center member extends so as to cover an upper portion of the cylinder support bracket.

5. The center frame according to claim 2, wherein tips of pronged lower plate have shapes that become broader toward the front and/or rear.

6. The center frame according to claim 2, wherein a bracket lower plate welded and fixed to an underside face of the cylinder support bracket and to internal faces of the blade support brackets is welded and fixed to the center front plate so as to hold the center front plate between the lower plate and the bracket lower plate itself.

7. The center frame according to claim 1, wherein in each of the bending portions of the center member is formed along a straight line connecting an outermost end edge side of the corresponding blade support bracket and a corresponding periphery of the circular base.

8. The center frame according to claim 7, wherein a front end of the center member extends so as to cover an upper portion of the cylinder support bracket.

9. The center frame according to claim 7, wherein tips of pronged lower plate have shapes that become broader toward the front and/or rear.

10. The center frame according to claim 7, wherein a bracket lower plate welded and fixed to an underside face of the cylinder support bracket and to internal faces of the blade support brackets is welded and fixed to the center front plate so as to hold the center front plate between the lower plate and the bracket lower plate itself.

11. The center frame according to claim 1, wherein a front end of the center member extends so as to cover an upper portion of the cylinder support bracket.

12. The center frame according to claim 11, wherein tips of pronged lower plate have shapes that become broader toward the front and/or rear.

13. The center frame according to claim 11, wherein a bracket lower plate welded and fixed to an underside face of the cylinder support bracket and to internal faces of the blade support brackets is welded and fixed to the center front plate so as to hold the center front plate between the lower plate and the bracket lower plate itself.

14. The center frame according to claim 11, wherein, in left and right ends of the center front plate, the welding and fixing of the center front plate and the center member and the welding and fixing of the center front plate and the corresponding blade support bracket are achieved by a continuous weld bead.

15. The center frame according to claim 1, wherein tips of pronged lower plate have shapes that become broader toward the front and/or rear.

16. The center frame according to claim 15, wherein, in left and right ends of the center front plate, the welding and fixing of the center front plate and the center member and the welding and fixing of the center front plate and the corresponding blade support bracket are achieved by a continuous weld bead.

17. The center frame according to claim 1, wherein a bracket lower plate welded and fixed to an underside face of the cylinder support bracket and to internal faces of the blade support brackets is welded and fixed to the center front plate so as to hold the center front plate between the lower plate and the bracket lower plate itself.

18. The center frame according to claim 17, wherein, in left and right ends of the center front plate, the welding and fixing of the center front plate and the center member and the welding and fixing of the center front plate and the corresponding blade support bracket are achieved by a continuous weld bead.

19. The center frame according to claim 1, wherein, in left and right ends of the center front plate, the welding and fixing of the center front plate and the center member and the welding and fixing of the center front plate and the corresponding blade support bracket are achieved by a continuous weld bead.

* * * * *